3,113,992
FOCUSSING TELESCOPE LENS SYSTEM

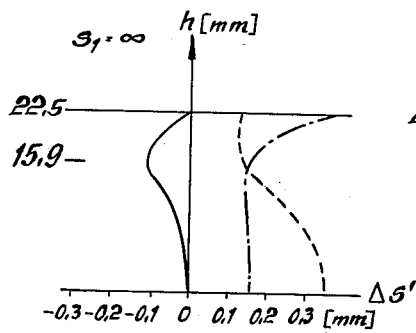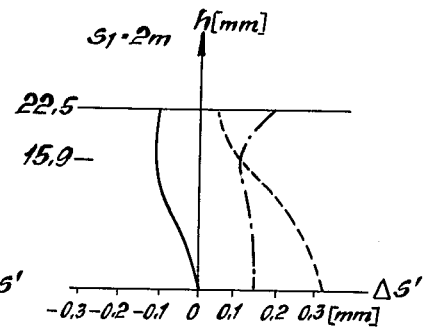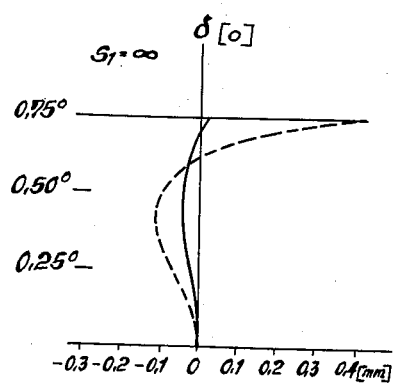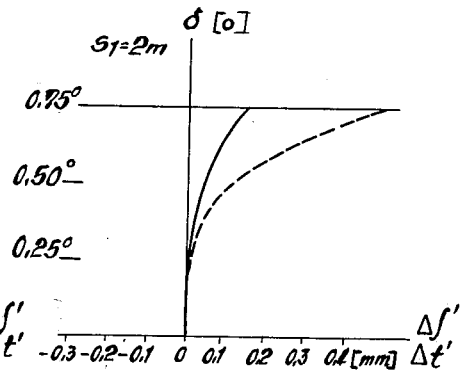

Klaus Hildebrand, Berlin-Neukolln, Germany, assignor, by mesne assignments, to Keuffel & Esser Company, Hoboken, N.J., a corporation of New Jersey
Filed Nov. 29, 1961, Ser. No. 155,603
Claims priority, application Germany Nov. 30, 1960
2 Claims. (Cl. 88—57)

This invention relates to an improvement in focusing telescopes comprising a three-lens sub-system of positive refractive power (positive) and, located at a certain distance therefrom, a sub-system of negative refractive power (negative), and an eyepiece; where the positive sub-system comprises two lenses enclosing a dispersive cemented surface, and a free-standing or air-spaced collective lens disposed toward the negative.

Telescopes of this type are known. (See for instance Kohler-Konig "Die Fernrohre und Entfernungsmesser" Springer-Verlag 1959, page 133.) Relatively short telescopes of this type are, for instance, used as sighting telescopes on theodolites. They permit adequate correction of spherical, chromatical and zonal aberrations and fulfill sine conditions even with large relative aperatures of the objective.

On the other hand, apertural error increases disturbingly with a decrease of the object distance. Though this fact is of little importance for ordinary use, i.e. when pointing at objects at medium or large distances, deterioration of the image quality at reduced object distances is often considered to be a disadvantageous and disturbing factor. Also, it is difficult to keep astigmatism of the system within certain limits.

It has now been established that telescopes of the above described type cannot only be made aplanatic for certain distances, but can also be constructed so that the apertural error can be corrected for all object distances, without astigmatism and image field curvature exceeding certain magnitudes.

In the drawing:

FIGURE 2 shows, in connection with FIGURE 3, the spherical aberrations of the telescope which construction data are listed in the table below.

Figure 1:
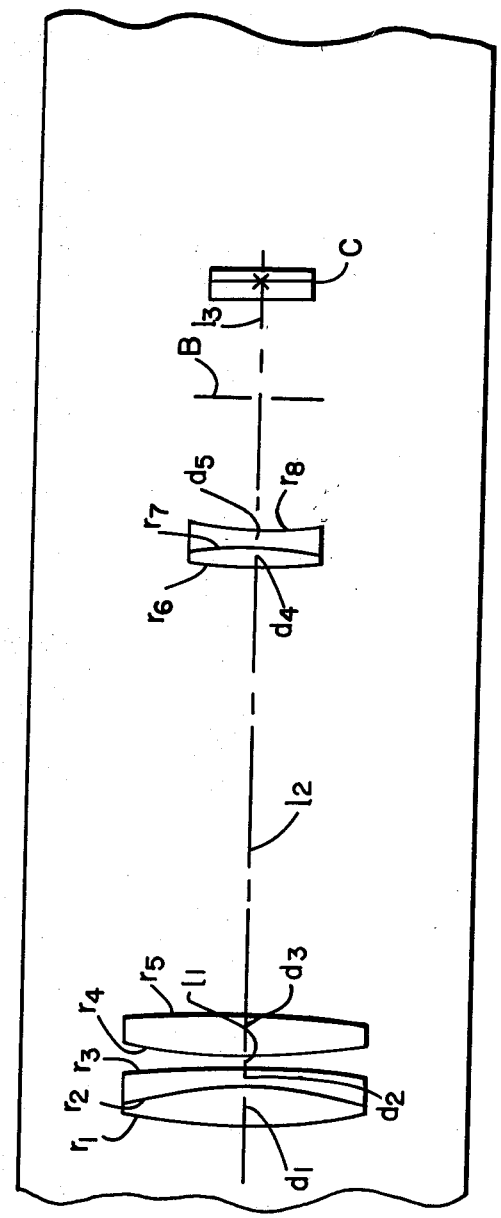
FIGURE 1 shows an optical system of the present invention.

FIGURES 4 and 5 disclose the remaining astigmatism of said telescope.

According to the present invention, this type of corrected telescope has been developed so that the surface refractive power of the first surface on the object-side of the positive sub-system satisfies the formula $$+0.3 \leq (n_1'-1)\frac{F_p}{r_1} \leq +0.6$$

and that the surface refractive power of the second surface satisfies the formula $$-0.35 \leq (n_2'-n_1')\frac{F_p}{r_2} \leq -0.25$$

where the Abbe number of the glass of the first lens is greater than 1.7 times the Abbe number of the glass of the second lens, and the refractive power of the collective lens of the positive sub-system is smaller than 0.7 times the refractive power of the positive sub-system, and where $F_p$ is the focal length of the positive sub-system, $r_1$ and $r_2$ the radii of the surfaces, and $n_1'$ and $n_2'$ the refractive indexes of the first and second lens of the positive sub-system.

It has been found that astigmatism of the systems in telescopes of the present invention can still be satisfactorily corrected even if the negative system of the telescope comprises two lenses cemented to each other. FIGURE 1 shows an astronomic telescope including a reticle C, but without showing the eyepiece, as an example of construction. The construction data refers to a focal length $F=255$ mm. for the entire objective. The diaphragm B is securely mounted. The example of construction is based on the data of the table given below, where thickness of the lenses and distance of the lenses are of little criticality.

| Radii (mm.) | Thickness or Distances (mm.) | $n_e$ | $V_e$ |
|---|---|---|---|
| $r_1 = +141.4$ | | | |
| | $d_1 = 8.0$ | $n_1' = 1.5186$ | 63.8 |
| $r_2 = -86.9$ | | | |
| | $d_2 = 4.0$ | $n_2' = 1.7235$ | 29.3 |
| $r_3 = -392.9$ | | | |
| | $l_1 = 0.5$ | | |
| $r_4 = +101.6$ | | | |
| | $d_3 = 7.0$ | $n_3' = 1.4895$ | 69.7 |
| $r_5 = -2,847.0$ | | | |
| | $l_2 = 88.9$ | | |
| $r_6 = +61.3$ | | | |
| | $d_4 = 2.5$ | $n_4' = 1.6237$ | 36.1 |
| $r_7 = -36.8$ | | | |
| | $d_5 = 2.0$ | $n_5' = 1.5186$ | 63.8 |
| $r_8 = +14.5$ | | | |
| | $l_3 = 49.8$ (image) | | |

For the distant ranges of the telescope of the present invention, correction of the apertural error is essentially achieved by making the apertural error of the positive sufficiently small for that object-side back focal length which is coupled with an image-side back focal length which comprises the sum of the distances between the positive and the focusing lens on the one hand and between the image plane and the focusing lens on the other hand.

It should also be mentioned that if the focusing lens is designed as a cemented two-lens system, the contribution of the negative to coma correction is essentially a function of its contribution to the correction of the apertural error.

On account of the necessary correction of spherical aberration and the necessity to fulfill the sine condition there exists an inter-relationship between the contributions to apertural error and coma by the positive, and the corresponding contribution by the negative. In the final analysis, astigmatism of the entire system is, to this extent, a function of the contribution of the positive system to apertural error and coma, where these two variables are, of course, independent of each other only to a certain extent due to the cementing conditions to be maintained for the negative.

The longitudinal chromatic aberration of the positive and of the negative have to be individually eliminated for each one.

The spherical aberrations shown in FIGS. 2 and 3 are listed for the three colors $e$, $c$ and $f$, and it should be noted that the optical system is fully aplanatic for objects pointed at a distance $s_1 = \infty$. However, the sine condition has been fulfilled in a sufficient manner too for all objects pointed at a distance $s_2 = 2000$ mm.

For said two distances $s_1$ and $s_2$ the spherical aberrations of the system are plotted, the sagittal image in full and the meridional image in dashed line, in FIGS. 4 and 5 respectively.

It may be added that for the error commonly called spherical aberration the word "apertural error" has been used at some places of the above description.

Using negative systems with uncemented lenses is within the scope of the present invention. The present invention is not restricted to the above form of construction since it is apparent that the described example is capable of many variations and modifications within the scope of the present invention. All such variations and modifications are to be included within the scope of the present invention.

What is claimed is:

1. A focusing telescope lens system, comprising a three-lens optical sub-system of positive refractive power, a sub-system of negative refractive power located at a distance from the sub-system of positive refractive power, said sub-system of positive refractive power comprising a first lens and a second lens enclosing a dispersive cemented surface, and an air-spaced collective lens which faces the sub-system of negative refractive power; wherein the surface refractive power of the first object-side surface of the sub-system of positive refractive power satisfies the formula $$+0.3 \leq (n_1'-1)\frac{F_p}{r_1} \leq 0.6$$

and the surface refractive power of the second surface satisfies the formula $$-0.35 \leq (n_2'-n_1')\frac{F_p}{r_2} \leq -0.25$$

where the Abbe number of the glass of said first lens is larger than 1.7 times the Abbe number of the glass of said second lens, and the refractive power of the collective lens is smaller than 0.7 times the refractive power of the sub-system of positive refractive power, and wherein $F_p$ is the focal length of said positive sub-system, $r_1$ and $r_2$ the radii of said first and second surfaces, and $n_1'$ and $n_2'$ the refractive indexes of said first and second lenses, and wherein $F_p$ is 100 mm. to which said radii and thicknesses and air spacing are referred and where:

| | | | |
|---|---|---|---|
| $r_1=+\ 113.4$ | $d_1=6.4$ | $n_1'=1.5186$ | $V_1=63.8$ |
| $r_2=-\ \ 69.7$ | $d_2=3.2$ | $n_2'=1.7235$ | $V_2=29.3$ |
| $r_3=-\ 315.1$ | $l_1=0.4$ | --- | --- |
| $r_4=+\ \ 81.5$ | $d_3=5.6$ | $n_3'=1.4895$ | $V_3=69.7$ |
| $r_5=-2,283.0$ | | | | wherein $r_3$ is the radius of the second surface of said second lens, $r_4$ is the radius of said collective lens surface disposed toward said first and second lenses, and $r_5$ is the radius of the collective lens surface disposed toward said negative sub-system, $d_1$ and $d_2$ and $d_3$ are the thicknesses along the optical axis of said first and second lenses and said collective lens respectively, $l_1$ is the air space distance between said second lens and said collective lens along the optical axis, $n_3$ is the refractive index of said collective lens, and $V_1$, $V_2$, and $V_3$ are the reciprocal dispersions of the glass of said first, said second and said collective lenses respectively; the following tolerances being permissible: for the radii:

$$\frac{\Delta r}{r} = \pm 1 \times 10^{-2}$$

for the refractive indices:

$$\frac{\Delta n}{n} = \pm 1 \times 10^{-1}$$

and for the reciprocal dispersions:

$$\Delta V = \pm 3$$

2. A telescope in accordance with claim 1, wherein said sub-system of negative refractive power comprises two lenses which are cemented to each other.

References Cited in the file of this patent

FOREIGN PATENTS

| | | |
|---|---|---|
| 318,178 | Germany | Jan. 15, 1920 |
| 551,011 | Great Britain | Feb. 4, 1943 |